July 10, 1962     H. BARISHMAN     3,043,008
DENTAL TOOLS
Filed Oct. 15, 1958
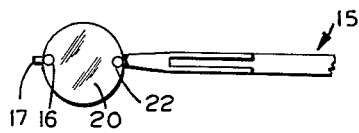
FIG.2
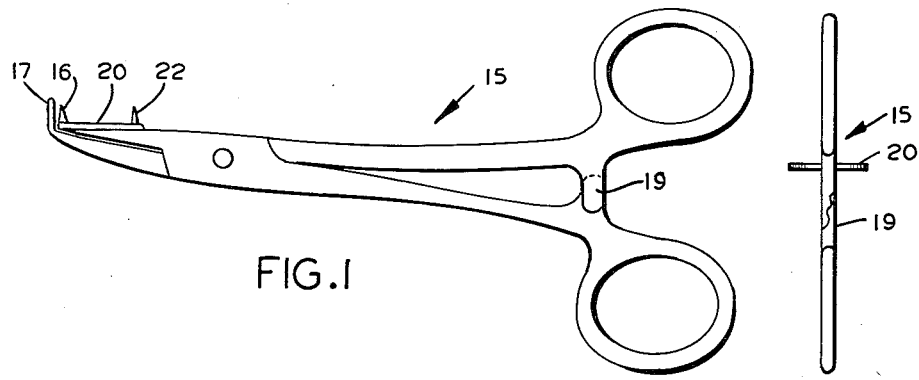
FIG.1
FIG.3
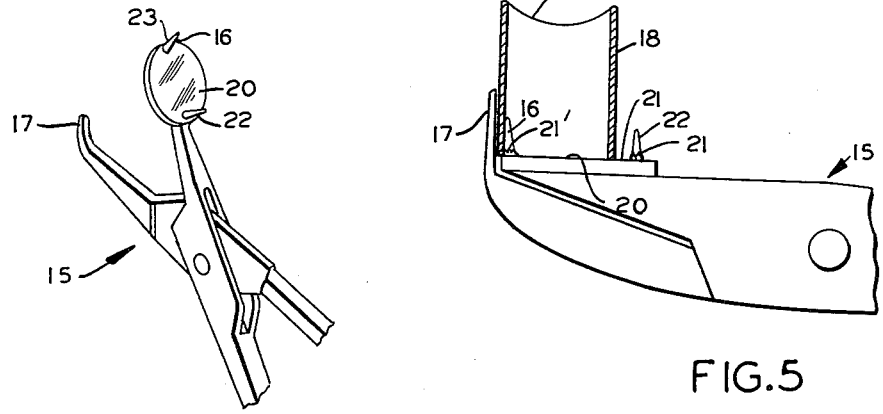
FIG.4
FIG.5
INVENTOR,
HARRY BARISHMAN,
ATTORNEY

United States Patent Office 3,043,008
Patented July 10, 1962

3,043,008
DENTAL TOOLS
Harry Barishman, 1676 Ocean Parkway, Brooklyn, N.Y.
Filed Oct. 15, 1958, Ser. No. 767,327
8 Claims. (Cl. 32—17)

The present invention relates to a dentist's tool for use in the process of making a mold of a patient's tooth which is to receive a crown or inlay.

Essentially, a tubular band, usually of copper, is filled with a modelling compound. The compound being initially hard and separate from the tube, both must be heated during the filling operation, to make and maintain the compound in plastic state. In hot condition, the tube so laden, is set into the mouth onto the tooth being treated, whereby the band is positioned thereabout and the tooth makes its impression in the still plastic compound. At such time as his procedure dictates, the dentist removes the tube and its content from off the tooth and out of the mouth. The mold cavity so produced is used in well known manner to form a die of more permanent nature, to be used for casing the crown or inlay.

Heretofore, the tubular band was the tool held in hand while being heated and filled. Using a Bunsen burner, required that the band be held aloft, making it difficult to fill the tubular piece which of course is open at both ends. Improper luting was a common occurrence and uniform viscosity in the molten mass within the tube, was difficult to attain. Further, the tube while hot, was inserted into the patient's mouth by holding the tube between two fingers and if the tooth being treated was in the rear of the mouth, to reach it, the tube had to be held between a finger of both hands. At best, it was an ordeal, a messy job and often fingers were scalded during the filling operation. Also to be noted, is that the dentist by the use of his hands to hold and set the laden tube onto the tooth, hid the tube from view and it was difficult for him to see to set the festooned rim of the tube to coincide with the gum line of the tooth; such festooning of the tube rim having been attended to before the filling of the tube with compound.

It is therefore an object of this invention to provide a novel and improved dentist's tool which will avoid the foregoing objections by making the band part of the tool.

Another object thereof is to provide a novel and improved dentist's hand tool releasably holding the tubular band while it is being heated and filled with the compound, affording means to close one end of such band so that it could be filled; such tool so laden, being then moved to enter the filled band into the patient's mouth, set it to encircle the tooth being treated and thus press the compound filling so that the tooth enter it to start an impression therein. For practical constructions, such tool includes the form of a tweezer or plier or any other suitable releasable clamping means.

A further object of the invention is to provide a novel and improved dentist's tool of the character mentioned, which does not distort its tube and can have as part thereof tubes of different diameters and yet be of constant size when gripping the tube, regardless of tube dimensions.

Another object thereof is to provide a novel and improved dental tool of the nature set forth, having means to hold a piece of paper against the temporarily closed end of the tube; such paper element becoming adhered to the compound and serving as an aid to the dentist for his final manual manipulations.

Still a further object of this invention is to provide a novel and improved dentist's tool of the type set forth, which is simple in construction, reasonable in cost, easy to use and efficient in carrying out the functions for which it is designed.

Other objects and advantages will become apparent as this disclosure proceeds.

For the practice of this invention, one of the forms it may assume, is to have a means with a pair of relatively movable pin jaws clamping the wall of a tubular band so that one jaw is inside and the other jaw is outside such tube. A platform element is secured at the periphery of one of said pin jaws in a plane substantially perpendicular to such jaw and away from the other pin jaw, leaving said jaws free to co-operate to clamp the wall of the tube between them while such tube rests with an end thereon on said platform element. In order that the viscous compound within the tube shall not stick to said platform element, a paper disc is placed thereon so that it is engaged by the pin jaw associated with said element, prior to the setting of the empty tube onto the platform element, in preparation for the filling operation. If desired, said platform element may have a pin extending therefrom, so that the paper piece may also be engaged thereby and hence will not shift on said platform. The jaws may be those of a plier-like tool which is provided with locking means to hold tube-gripping position. Since it is most practical to use the plier form, it will be resorted to, to explain and illustrate this invention as a preferred embodiment thereof.

In the accompanying drawing forming part of this specification, similar characters of reference indicate corresponding parts in all the views.

FIG. 1 is a face view of a plier-type structure embodying the teachings of this invention, with jaws closed.

FIG. 2 is a fragmentary top plan view thereof.

FIG. 3 is a side view of FIG. 1.

FIG. 4 is a fragmentary perspective view of said plier-type structure, shown with jaws apart.

FIG. 5 is a fragmentary enlarged view like FIG. 1, showing a tubular band standing with one end atop a paper piece on the platform element and its wall gripped by the jaws, ready to be filled with molding compound.

In the drawings, the numeral 15 designates generally a plier-like structure whose relatively movable jaws terminate in the pins 16 and 17 respectively, and designating them as pin jaws, they clamp the wall of a tubular band 18 when the pin jaw 16 is within such tubular member and the plier is closed. If desired, any locking means may be provided as for instance the disengagable rack parts shown at 19, to maintain the plier closed. Said pin jaw 16 is at or near the perimeter of a thin disc 20 which extends away from the pin jaw 17, is secured to to plier jaw of pin 16 and serves to support a tubular band 18 standing on end thereon. Said pin jaw 16 extends substantially perpendicularly from the exposed face of said platform piece 20. It is preferred that the plane of said platform element 20 be perpendicular to the plane of the handles of the plier structure 15, and that the pin jaws 16, 17 be parallel when the plier is closed.

Since the tubular piece 18 is set on a paper piece 21 which covers the platform 20, as heretofore mentioned, said platform may have a second pin indicated at 22, so that the paper piece may be engaged by both pins 16 and 22 as shown in FIG. 5. Such second pin 22 is of course spaced from the pin 16, and is preferably at such position as to be outside the tube 18. Said pins 16, 22 are preferably tapered to aid the placement of the paper piece, and as to the pin jaw 16, to facilitate its withdrawal from the molding compound which said tube 18 is filled with after said tube is mounted. It may be noted that burrs 21' formed as shown when said paper piece is mounted on the pin jaw 16, further assure adhesion of said paper to the molding compound when the filled tube is removed from the platform 20.

The pins 16 and 22 are pointed and the pin jaw 16 is preferably conical in shape with its altitude 23 on its surface where it contacts the tube 18 when the latter is gripped between the jaws.

This plier 15 is quite thin and the area of the platform 20 being little more than the cross section of the largest tooth in the mouth, it is evident that the tool may be entered into the mouth to bring the compound-laden tubular band 18 onto any tooth which has been prepared in known fashion to receive it and thereupon the plier 15 is manipulated to commence the impression of such tooth in the compound at the open end of such tube.

It is to be noted that the tube 18 is prepared with a festooned edge 18' to conform with the gum line of the tooth treated, and in setting such tube with its content onto the tooth, the plier is manipulated so that when the tube is pressed down, the edge 18' thereof shall coincide with the gum line. Of course, it is the "flat" edge of said tube which is positioned on the platform 20.

This invention is capable of numerous forms and various applications without departing from the essential features herein set forth. It is therefore intended and desired that the embodiment shown herein shall be deemed illustrative and not restrictive and that the patent shall cover all patentable novelty herein disclosed; reference being had to the following claims rather than to the specific description herein to indicate the scope of this invention.

I claim:

1. In a tool of the character described, for holding molding material to be applied onto a patient's tooth to make an impression thereof, a first member, a platform element fixed to said first member, an upright tubular band to be filled with a plastic mass, standing on said platform; said platform closing the lower end of said tubular band, a straight first jaw element extending upwardly from a relatively small part of the supporting surface of said platform, into said band and contacting the inner surface of the wall of said band; a second member, a second jaw element fixed on said second member, means joining said members for relative movement whereby said jaw elements can be brought towards each other to grip the wall of said tubular band between them; said members being relatively movable whereby said jaw elements part to release the tubular band; said first jaw element being withdrawable from the plastic mass when the filled band is released from the grip of said jaw elements.

2. The tool as defined in claim 1, wherein those parts of the surfaces of the jaw elements which contact and grip the wall of a tubular band between them, conform with the initial shape of the tubular band wherever they grip said band wall tightly.

3. The tool as defined in claim 1, including a pin extending upwardly from the platform and spaced from said first jaw element to be outside the band; the first jaw element also being a pin.

4. The tool as defined in claim 1, wherein the jaw element extending from the platform is an upwardly tapering pin.

5. The tool as defined in claim 1, wherein the first member is on a handle means which is substantially parallel to the plane of the platform.

6. The tool as defined in claim 1, wherein the jaw elements are the jaws of a plier-like device; the plane of the platform being perpendicular to the plane in which the handles of the plier move when the jaws open and close.

7. The tool as defined in claim 1, wherein the jaw element extending from the platform is a conical pin whose altitude is perpendicular to the platform and in the surface of said pin where said pin contacts the tube when the tube is gripped between the jaw elements.

8. The tool as defined in claim 1, wherein the first jaw element is at the periphery of the platform.

References Cited in the file of this patent

UNITED STATES PATENTS

| | | |
|---|---|---|
| 168,012 | Gaillard | Sept. 21, 1875 |
| 1,106,815 | Hopkins | Aug. 11, 1914 |
| 1,464,807 | Clark | Aug. 14, 1923 |
| 1,518,021 | Truxillo | Dec. 2, 1924 |
| 2,089,715 | Simmons | Aug. 10, 1937 |
| 2,253,132 | Malson | Aug. 19, 1941 |
| 2,254,165 | Brooks | Aug. 26, 1941 |